United States Patent

Merlo et al.

[11] 4,187,218
[45] Feb. 5, 1980

[54] WATER-SOLUBLE ACID AZO DYE

[75] Inventors: Fabrizio Merlo, Saronno; Giorgio Bornengo, Novara; Camillo Paffoni, Pogno, all of Italy

[73] Assignee: Montedison S.p.A., Milan, Italy

[21] Appl. No.: 886,943

[22] Filed: Mar. 15, 1978

[30] Foreign Application Priority Data

Mar. 17, 1977 [IT] Italy .................. 21341 A/77

[51] Int. Cl.$^2$ .................. C09B 29/36; C09B 29/06
[52] U.S. Cl. .................. 260/158; 260/175; 260/207; 260/207.1
[58] Field of Search .................. 260/175, 207.1, 207, 260/158

[56] References Cited

U.S. PATENT DOCUMENTS

| 1,342,134 | 6/1920 | Schedler | 260/158 |
| 1,483,447 | 2/1924 | Huismann | 260/158 |
| 2,760,959 | 8/1956 | Bossard et al. | 260/175 |
| 2,768,159 | 10/1956 | Bossard et al. | 260/175 X |
| 3,419,542 | 12/1968 | Meininger et al. | 260/158 X |
| 3,525,733 | 8/1970 | Weaver et al. | 260/158 X |
| 3,637,653 | 1/1972 | Brachel et al. | 260/207 |
| 4,087,420 | 5/1978 | Heinrich et al. | 260/207 |

FOREIGN PATENT DOCUMENTS

| 2256313 | 5/1973 | Fed. Rep. of Germany | 260/207.1 |
| 805528 | 11/1936 | France | 260/175 |
| 7202686 | 9/1972 | Netherlands | 260/207.1 |

Primary Examiner—John Doll
Attorney, Agent, or Firm—Morgan, Finnegan, Pine, Foley & Lee

[57] ABSTRACT

This invention relates to a class of water-soluble acid azo dyes, containing at least a sulphonic group, having formula (I):

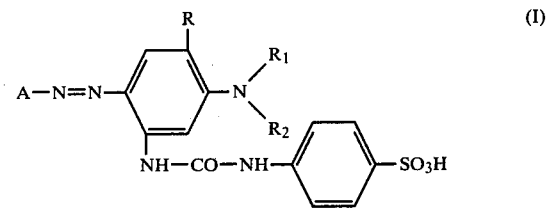

wherein the symbols have the following meanings:
  A is a residue of a diazotizable aromatic or heterocyclic amine, optionally substituted;
  R is selected from the group consisting of H, $CH_3$, $OCH_3$ and $OC_2H_5$;
  $R_1$ is selected from the group consisting of $CH_3$ and $C_2H_5$;
  $R_2$ is selected from the group consisting of $CH_3$ and $C_2H_5$.

The dyes which are the object of the present invention exhibit shades varying from yellow to blue and are useful for dyeing and printing natural polyamide fibres (wool and silk) and synthetic fibres (nylon). They possess an excellent affinity in both an acid bath and a neutral bath and an excellent tinting power. The dyes obtained are characterized by a remarkable purity of shade, by an excellent stability to sunlight, to washing and to sweat, as well as by a good equalizing power on nylon.

1 Claim, No Drawings

WATER-SOLUBLE ACID AZO DYE

BACKGROUND OF THE INVENTION

As far as we know, the class of dyes having formula (I) and forming the objects of this invention, as stated hereinafter, have not been described so far.

OBJECTS OF THE INVENTION

An object of the present invention to provide a new class of water-soluble acid azo dyes having high dyeing characteristics in the field of the above-cited applications, and a process for preparing same. Other objects of the invention will be apparent from the description which follows:

SUMMARY OF THE INVENTION

Water-soluble acid azo dyes, containing at least a sulphonic group, having formula (I):

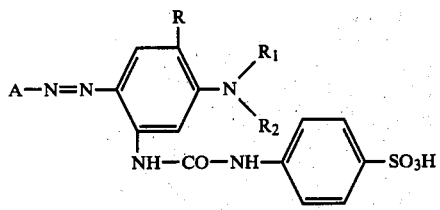

wherein:
A is a residue of a diazotizable aromatic or heterocyclic amine, optionally substituted;
R is selected from the group consisting of H, $CH_3$, $OCH_3$ and $OC_2H_5$;
$R_1$ is selected from the group consisting of $CH_3$ and $C_2H_5$;
$R_2$ is selected from the group consisting of $CH_3$ and $C_2H_5$.

GENERAL DESCRIPTION OF THE INVENTION

It has been found that the objects of this invention may be realized by providing a class of water-soluble sulphonic azo dyes having formula (I) and by the process for preparing same, characterized in that an amine of formula $A-NH_2$, where A is the residue of an aromatic or heterocyclic, optionally substituted, nucleus, is diazotized at a temperature comprised between about 0° C. and 5° C., according to conventional techniques, and the resulting diazo-derivative is then coupled with a compound having formula (II):

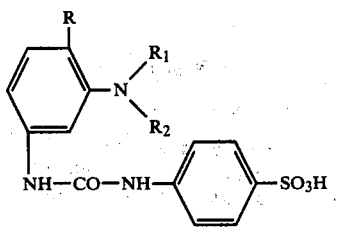

wherein R, $R_1$, $R_2$ have the meanings specified hereinbefore, at a temperature ranging from about 5° to 20° C., according to conventional techniques.

The dyes of formula (I) are therefore easily obtainable by diazotization of an amine $A-NH_2$ according to conventional techniques, for example at a temperature comprised between about 0° and 5° C., and by successive coupling of the resulting diazo compound with an amine having structural formula (II):

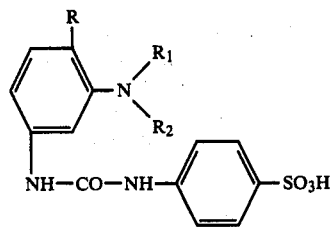

wherein A, R, $R_1$, $R_2$ have the meanings specified hereinbefore, for example at a pH of from about 2 to 7 and at temperatures between about 5° and 20° C., according to conventional techniques too. Employable amines of formula $A-NH_2$ are in practice: 4-nitroaniline, 2-nitroaniline, 2-chloroaniline, 3-chloroaniline, 4-chloroaniline, 2-cyanoaniline, 4-cyanoaniline, 4-aminoacetanilide, 4-methylsulphonylaniline, 3-methylsulphonylaniline, methylanthranilate, methyl 4-amino-benzoate, 2-nitro-4-chloroaniline, 2-chloro-4-nitroaniline, 2,5-di-chloroaniline, 2-chloro-4-methylsulphonylaniline, 2-chloro-5-methylsulphonyl-aniline, 2-chloro-4-sulphamido-aniline, 2-methyl-5-phenyl-sulphamido-aniline, 2-methoxy-5-(N,N-di-ethyl)sulphamido-aniline, 2-methyl-5-chloroaniline, 2-trifluoromethyl-4-chloroaniline, 2-chloro-5-cyano-aniline, 4-nitro-2-methylsulphonyl-aniline, 4-aminoazobenzene, 2-aminobenzothiazole, 2-amino-6-methylsulphonyl-benzothiazole, 2-amino-5-nitrothiazole, 3-amino-5nitrobenzoisothiazole, 2,4-dinitro-6-bromo-aniline.

The amines of structural formula (II) can be prepared by condensation of an amine of structural formula (III):

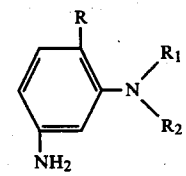

where R, $R_1$, $R_2$ have the meanings specified hereinbefore, with a phenyl isocyanate and successive sulphonation of the condensation product, according to known techniques.

The condensation, therefore, can be advantageously conducted in an inert solvent, such as, e.g., benzene, toluene, chlorobenzene, at temperatures ranging from about 20° to 70° C. The product can be easily isolated by filtration, the yields being very high.

Sulphonation is carried out in 100% sulphuric acid by addition of an equimolecular amount or a slight excess of 60% oleum.

The sulphonated product, in its turn, can be isolated by discharging the sulphonation mass into water and ice and by directly filtering the precipitate.

Coupling generally occurs in an aqueous phase at acid pH or at neutral pH, for example from a pH=2 to a pH=7, depending on the coupling agent.

Finally, the dyes are isolated by filtration of the reaction mass; a conventional salting with sodium chloride or potassium chloride is sometimes necessary for the purpose of completing the precipitation. In any case the techniques employed are well-known and described.

The dyes according to this invention possess a good solubility in water and are applied under the usual dyeing conditions of the polyamide fibres.

SPECIFIC DESCRIPTION OF THE INVENTION

The following examples are given to illustrate the present invention, without being, however, a limitation thereof.

Unless otherwise specified, the parts and the percentages are by weight.

EXAMPLE 1

1.4 parts of sodium nitrite were dissolved at 60° C. in 20 parts of concentrated sulphuric acid. After cooling to room temperature, 4.1 parts of 2-chloro-4-methylsulphonyl-aniline were added thereto in 10 minutes. It was stirred at room temperature for 2 hours, it was cooled down to 0° -5° C. and 0.2 parts of urea were added in order to eliminate the nitrite in excess; the diazo solution was admixed, in 15 minutes, to a solution containing 7.5 parts of N,N-diethyl-m-N-(4-sulphophenyl-amino-carbonyl)-phenylendiamine in 100 parts of a water/ice mixture and 1 part of concentrated ammonia; simultaneously, a 30% solution of caustic soda was added in such amount, as to maintain a pH value equall to 3-4. Temperature was kept at 10°-15° C. After stirring for 1 hour, the dye was filtered, washed with 50 parts of a 10% solution of sodium chloride and dried at 60° C. Obtained were: 12 parts of dye in the form of a brownish red powder that dyed nylon scarlet red, with an excellent fastness to sunlight and washing. The IR and NMR analyses corresponded with the structure of the dye of formula (I), where A=a residue of 2-chloro-4-methylsulphonyl-aniline, R=H, $R_1=R_2=C_2H_5$.

EXAMPLE 2

1.4 parts of sodium nitrite were dissolved at 60° C. in 10 parts of concentrated sulphuric acid. It was cooled to room temperature, whereupon 8.5 parts of acetic acid and 1.5 parts of propionic acid were added. After cooling to 5° C., 3.1 parts of 2-cyano-5chloroaniline were added thereto and it was stirred for 1 hour at 0° -5° C. The nitrite in excess was removed with 0.2 parts of urea, and the diazo solution was admixed, in 15–20 minutes, to a solution containing 7.5 parts of N,N-diethyl-m-N-(4-sulphophenylaminocarbonyl)-phenylendiamine in 100 parts of a water-ice mixture and 1 part of concentrated ammonia; a 30% solution of caustic soda in an amount necessary to maintain a pH value=3-4 was simultaneously added at a temperature of 10°-15° C. It was stirred for 1 hour, then the dye was filtered, washed with 50 parts of a 10% solution of sodium chloride and dried at 60° C.

Obtained were: 13.5 parts of a brownish red powder that dyed nylon scarlet red, with excellent stabilities to sunlight and washing.

The IR and NMR analyses corresponded with the structure of the dye of formula (I), where A=a residue of 2-cyano-5-chloroaniline, R=H, $R_2=R_1=C_2H_5$.

N,N-diethyl-m-N-(4-sulphophenylaminocarbonyl)-phenylendiamine, employed in examples 1 and 2, was prepared as follows:

32.8 parts of N,N-diethyl-m-phenylendiamine were dissolved in 350 parts of toluene. 25 parts of phenyl-isocyanate were added thereto in 30 minutes under stirring, whereupn it was heated to 60° C. for 3 hours. It was cooled to 10°-15° C., then the product was filtered, washed with 50 parts of toluene and dried at 60° C. 52 parts of N,N-diethyl-m-N-(phenylaminocarbonyl)-phenylendiamine were obtained. To effect the sulphonation, said 52 parts of amine were added, in small doses, to 42 parts of 100% sulphuric acid, whilst simultaneously cooling from the outside, whereupon, in 15 minutes, 42 parts of 60% oleum were added and it was heated to 60° C. for 4 hours under stirring. The mass was allowed to cool to room temperature, then it was poured into 300 parts of ice and 100 parts of water. The product was filtered, washed to neutrality with 100 parts of 10% brine and dried in an oven at 60° C. 64 parts of N,N-diethyl-m-N-(4-sulphophenylamino-carbonyl)-phenylendiamine were obtained.

EXAMPLE 3

5.3 parts of 2-methyl-5-phenyl amino-sulphonyl aniline were dissolved, under stirring, in 50 parts of water and 10 parts of concentrated hydrochloric acid. It was cooled down to 0° -5° C. and a solution containing 1.5 parts of sodium nitrite in 10 parts of water was added.

The whole was kept at 0°-5° C. for 30 minutes, whereupon the nitrous acid excess was removed by adding 0.2 parts of sulphamic acid. The resulting diazo solution was admixed in 10 minutes to a solution containing 6.9 parts of N,N-dimethyl-m-N-(4-sulphophenyl-aminocarbonyl)-phenylendiamine in 100 parts of water; simultaneously, sodium acetate was added there to in order to keep a pH value of 4–5.

It was stirred for 1 hour at 10°-15° C., then the dye was filtered, washed with 50 parts of a sodium chloride 10%-solution and dried in an oven at 60° C.

14 parts of dye in the form of a brown powder that dyed nylon orange were obtained, having excellent stabilities to sunlight and washing, and the structural formula:

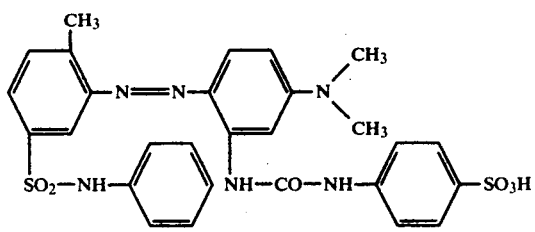

as confirmed by the IR and NMR analyses.

EXAMPLES 4 to 24

By operating as in the preceding examples, the dyes recorded on the following table were obtained by coupling the diazo of amine A-NH$_2$ with coupling agent (II):

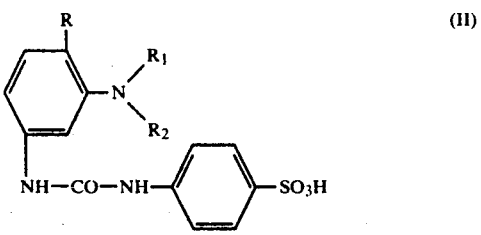

where the symbols have the known meaning.

| Example | A—NH₂ | R | R₁ | R₂ | Shade on nylon |
|---|---|---|---|---|---|
| 4 | 2-chloro-aniline | H | C₂H₅ | C₂H₅ | Gold yellow |
| 5 | 2-nitro-aniline | H | C₂H₅ | C₂H₅ | Red |
| 6 | 2-cyano-aniline | H | C₂H₅ | C₂H₅ | Orange |
| 7 | 4-amino-acetanilide | H | C₂H₅ | C₂H₅ | Orange |
| 8 | 4-methylsulphonyl-aniline | H | CH₃ | CH₃ | Scarlet red |
| 9 | methyl-2-aminobenzoate | H | C₂H₅ | C₂H₅ | Orange |
| 10 | ethyl-4-aminobenzoate | H | C₂H₅ | C₂H₅ | Orange |
| 11 | 2-chloro-4-nitroaniline | H | CH₃ | CH₃ | Violet |
| 12 | 2-chloro-5-methylsulphonylaniline | H | C₂H₅ | C₂H₅ | Reddish Orange |
| 13 | 2,5-dichloro-4-methylsulphonyl-aniline | OCH₃ | C₂H₅ | C₂H₅ | Violet |
| 14 | 2-methylsulphonyl-4-nitroaniline | H | C₂H₅ | C₂H₅ | Violet |
| 15 | 2-methyl-5-chloroaniline | H | C₂H₅ | C₂H₅ | Orange |
| 16 | 2-trifluoromethyl-4-chloroaniline | H | C₂H₅ | C₂H₅ | Orange |
| 17 | 2-methoxy-5-(N,N-diethyl)-sulphamido-aniline | H | C₂H₅ | C₂H₅ | Orange |
| 18 | 2-methoxy-5-chloroaniline | H | C₂H₅ | C₂H₅ | Orange |
| 19 | 2-chloro-5-methoxy-4-benzoylamino-aniline | H | C₂H₅ | C₂H₅ | Scarlet red |
| 20 | 4-aminoazobenzene | H | C₂H₅ | C₂H₅ | Bluish red |
| 21 | 2-amino-6-methylsulphonyl-benzothiazole | H | C₂H₅ | C₂H₅ | Violet |
| 22 | 2-amino-5-nitrothiazole | H | C₂H₅ | C₂H₅ | Blue |
| 23 | 3-amino-5-nitrobenzoisothiazole | H | CH₃ | CH₃ | Greenish blue |
| 24 | 2,4-dinitro-6-chloroaniline | H | C₂H₅ | C₂H₅ | Navy-blue |

EXAMPLE 25

0.5 parts of the dye obtained in example 1 were dissolved in 1000 parts of water at 60° C. 1 parts of concentrated ammonia and 1 part of acetic acid were added thereto. 50 parts of nylon were introduced into the dyeing bath; the temperature was then gradually brought to 100° C., keeping at boiling for 30 minutes. 1 part of acetic acid was added, it was heated further 30 minutes to 100° C., whereupon it was cooled to 60° C., rinsed and dried. A perfectly uniform, bright scarlet red dye was thus obtained, that exhibited excellent stabilities to sunlight, washing and sweat.

What we claim is:

1. A water-soluble acid azo dye having the formula:

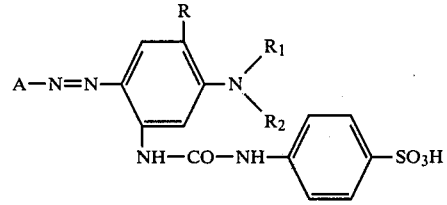

wherein:
A is a residue of a diazotizable aromatic or heterocyclic amine, optionally substituted;
R is selected from the group consisting of H, CH₃, OCH₃ and OC₂H₅;
R₁ is selected from the group consisting of CH₃ and C₂H₅; and
R₂ is selected from the group consisting of CH₃ and C₂H₅.